(12) United States Patent
Tooyama et al.

(10) Patent No.: US 7,734,410 B2
(45) Date of Patent: Jun. 8, 2010

(54) NAVIGATION SYSTEM

(75) Inventors: Yasuhiro Tooyama, Okazaki (JP);
Toshiaki Minami, Okazaki (JP); Naoko Aoyanagi, Okazaki (JP)

(73) Assignee: Aisin AW Co., Ltd. (JP)

( * ) Notice: Subject to any disclaimer, the term of this patent is extended or adjusted under 35 U.S.C. 154(b) by 638 days.

(21) Appl. No.: 11/711,044

(22) Filed: Feb. 27, 2007

(65) Prior Publication Data

US 2007/0203638 A1    Aug. 30, 2007

(30) Foreign Application Priority Data

Feb. 28, 2006   (JP)   ............................. 2006-051636

(51) Int. Cl.
*G01C 21/00*   (2006.01)
(52) U.S. Cl. ................... 701/200; 701/117; 340/995.13
(58) Field of Classification Search ................. 701/200, 701/211–212, 117–119
See application file for complete search history.

(56) References Cited

U.S. PATENT DOCUMENTS

| | | | | |
|---|---|---|---|---|
| 5,067,082 A | * | 11/1991 | Nimura et al. | 701/208 |
| 5,737,225 A | * | 4/1998 | Schulte | 701/211 |
| 5,862,510 A | | 1/1999 | Saga et al. | |
| 6,061,628 A | * | 5/2000 | Hayashi et al. | 701/208 |
| 6,388,582 B2 | * | 5/2002 | Yamashita et al. | 340/988 |
| 7,194,355 B2 | * | 3/2007 | Omi | 701/209 |
| 2006/0025924 A1 | | 2/2006 | Yoshikawa et al. | 701/209 |

FOREIGN PATENT DOCUMENTS

| | | |
|---|---|---|
| JP | 10-283589 | 10/1998 |
| JP | 11-325947 | 11/1999 |
| JP | 2004-108846 | 4/2004 |
| JP | 2004-108849 | 4/2004 |
| JP | 2004-239913 | 8/2004 |
| JP | 2006-048199 | 2/2006 |

* cited by examiner

*Primary Examiner*—Yonel Beaulieu
(74) *Attorney, Agent, or Firm*—Bacon & Thomas, PLLC

(57) ABSTRACT

When a display map information is reduced to a specified scale for a wide area, items of congestion information are extracted which have a congestion level of "congested or busy", and an overlap determination area is created for a congestion link of each item of extracted congestion information. The overlap determination area extends both transversely and longitudinally for a specified distance from the congestion link. Also, for each group of congestion information items having overlapping determination areas, an equal congestion level area is created by connecting the overlap determination areas and displayed in a color that corresponds to the congestion level. Equal congestion level areas are also created in the same manner for the congestion information items with congestion levels of "congested" and "not congested", and displayed in different colors that correspond to their respective congestion levels.

10 Claims, 10 Drawing Sheets

NAVIGATION SYSTEM

INCORPORATION BY REFERENCE

The disclosure of Japanese Patent Application No. 2006-051636 filed on Feb. 28, 2006, including the specification, drawings and abstract is incorporated herein by reference in its entirety.

BACKGROUND OF THE INVENTION

1. Field of the Invention

The present invention relates to a navigation system that displays map information and displays a guidance route to a destination on the map, particularly a navigation system that provides guidance that includes congestion information based on received road traffic information.

2. Description of the Related Art

In recent years, navigation systems have been more frequently installed in vehicles for providing guidance in driving the vehicle, so as to make it possible for the driver to more easily reach a desired destination. A navigation system is a system that is capable of detecting the vehicle's current position using a GPS receiver or the like, then obtaining map data that corresponds to the current position from a storage medium such as a DVD-ROM, hard disk, or the like, or through a network, and displaying the map data on a liquid crystal display. In addition to reading the map data that includes the vehicle's current position, from the storage medium or the like, drawing a map image of the area surrounding the vehicle's current position based on the map data, and displaying the map image on a display system, the navigation system displays a superimposed vehicle position mark on the map image, then scrolls the map image as the vehicle moves or keeps the map image stationary and moves the vehicle position mark, so that the driver can tell at a glance the location of the vehicle.

Various types of navigation systems have been proposed that provide congestion information based on received road traffic information. For example, a navigation system disclosed in Japanese Patent Application Publication No. JP-A-10-283589, (paragraphs (0007) to (0020), FIGS. 1 to 5) draws, on a display screen, a map corresponding to a host vehicle position, receives road traffic volume information from an external source, and displays road traffic volume information on the map. The navigation system also receives, from the external source, road traffic volume information that indicates the lengths of congested sections of monitored roads within specific predetermined areas ("meshes" or "grids"), as well as the congestion levels. The navigation system uses the total length of the monitored roads within each area, the lengths of the congested sections, and the congestion levels to compute the road traffic volume in a given area. The navigation system then controls the coloring or brightness levels of the map image of the area in a manner indicative of the road traffic volume.

However, the navigation system described in Japanese Patent Application Publication No. JP-A-10-283589 displays the average road traffic volume, that is, the average congestion level, for an entire area (grid). Therefore, when the map information display area is a wide area displayed on a reduced scale to a specified level or lower, for example, a wide area display that allows an entire metropolitan area to be viewed, many roads within the area (grid) are omitted from the display. It is therefore difficult to judge accurately which roads and which localities within the area have high traffic volume or are congested. Also, because the road traffic volume is averaged, the displayed road traffic volume is not accurate.

SUMMARY OF THE INVENTION

Accordingly, one object of the present invention is to provide a navigation system which accurately displays congestion information for road locations that are omitted from the display, thereby making it possible for a user to judge accurately which roads and which localities have high traffic volume or are congested, even when the map information display is a wide area display at a scale that is reduced to a specified level or smaller.

The navigation system according to one aspect of the present invention obtains the congestion information related to the display area of the map information, based on the received traffic information, then extracts from the congestion information that congestion information group with a specified (or predetermined) level of congestion. Based on the road links contained in the extracted congestion information, the navigation system also creates overlap determination areas that extend both transversely and longitudinally of the respective road links, for specified (or predetermined) distances, then groups the congestion information items which have overlapping determination areas. Next, the navigation system creates an equal congestion level area by connecting the overlapping determination areas that correspond to the grouped items of congestion information and displays the equal congestion level area superimposed on the map information display in a manner that the equal congestion level area is identifiable.

In this manner, the equal congestion level area is constructed by joining the overlapping determination areas, which are created based on the individual road links contained in the items in the congestion information group with the specified congestion level, so even when the displayed map information is reduced to a specified (predetermined) scale or smaller, e.g. a wide area display, the equal congestion level areas are formed such that they follow the displayed roads. It is therefore possible for the user to instantaneously recognize which roads in which areas are busy or congested and to easily determine, based on the map information, a detour that will bypass the congestion. Also, even when the map information display is reduced to a specified scale or smaller for a wide area display, such that the display omits some roads, the equal congestion level areas are formed by joining the overlapping determination areas, which correspond to road links for congestion information items in road locations that are omitted from the display, so it is possible to display the items of congestion information for road locations omitted from the display, and to display them in a form that follows the roads that are omitted from the display. It is therefore possible for the user to judge more accurately which roads in which areas are busy or congested.

Accordingly, the present invention provides a navigation system, including: a receiving section that receives traffic information including congestion information; a congestion information acquisition section that obtains from the traffic information, items of congestion information related to a map information display; a congestion information extraction section that extracts, from the items of congestion information obtained by the congestion information acquisition section, a congestion information group of items of information relating to road links with a specified level of congestion; an overlap determination area creation section that, based on road links related to the items of congestion information within the congestion information group, creates an overlap determination area that extends both transversely and longitudinally for a specified distance from each of the road links; a grouping section that groups the items of congestion information having overlapping determination areas; an equal congestion level area creation section that creates an equal congestion level area by connecting the overlapping determination areas of the grouped items of congestion information; and a display control section that displays the equal congestion level area superimposed on the map information display.

According to yet another aspect of the present invention, the equal congestion level area creation section, creates the equal congestion level areas for a plurality of respective congestion levels and displays the plurality of different level equal congestion areas superimposed on the displayed map information, such that the different levels of equal congestion can be distinguished from one another. Therefore, even when the display area for the map information is reduced to the specified scale or smaller for a wide area display, the equal congestion areas that correspond to the respective congestion levels are displayed such that they can be distinguished from one another.

In this manner, it is possible to display in detail the congestion information for roads located in areas omitted from the display, and it is possible for the display to show the distribution of the congestion levels. It is therefore possible for the user to judge more accurately which roads in which areas are busy or congested.

In the navigation system according to another aspect of the present invention, the display control section displays mutually differentiated display colors for the plurality of levels of equal congestion areas, superimposed on the map information display. Therefore, even when the display area of the map information is reduced to a specified scale (or smaller) for a wide area display, it is possible for the user to recognize each level of displayed equal congestion areas instantaneously and to easily determine, based on the map information, a detour that will bypass the congestion.

In the navigation system according to another aspect of the present invention, where the road links contained in the items of congestion information have determination areas which do not overlap and are directly connected in a road network, the virtual link creation section creates a virtual link that joins the road links. Also, based on the virtual link, the joining overlap determination area creation section creates a joining determination area, that extends both transversely and longitudinally for a specified distance from the virtual link, and the navigation system creates an equal congestion level area by joining the joining determination area with determination areas that overlap the joining determination area. This makes it possible to display an equal congestion level area without any distortions or the like.

According to another aspect of the present invention, when the map information display is reduced to the specified scale or smaller for a wide area display, the equal congestion level area is displayed superimposed on the map information display. Therefore, even when many roads are omitted from the display, the congestion information is accurately displayed for roads in locations omitted from the display; so it is possible for the user to accurately judge which roads in which areas are busy or congested.

"Section" as used herein refers to a programmed function ("means") of the CPU.

DETAILED DESCRIPTION OF THE PREFERRED EMBODIMENTS

A navigation system according to one embodiment of the present invention will be explained in detail below, with reference to the drawings.

First, the overall configuration of the navigation system of this first embodiment will be explained with reference to FIGS. 1, 1(A) and 2.

Figure 1:
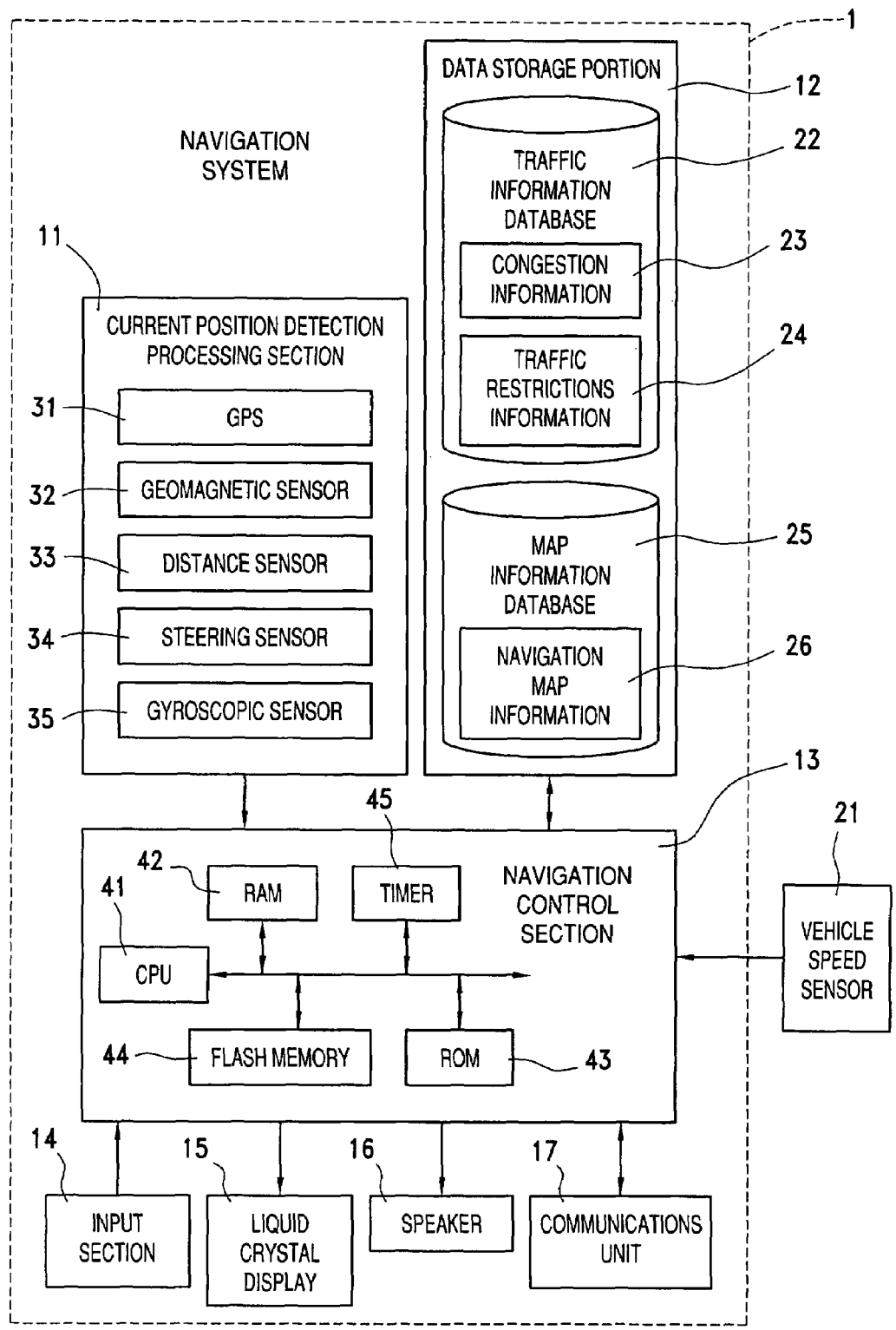
FIG. 1 is a block diagram of a navigation system according to one embodiment of the present invention.
Figure 1A:
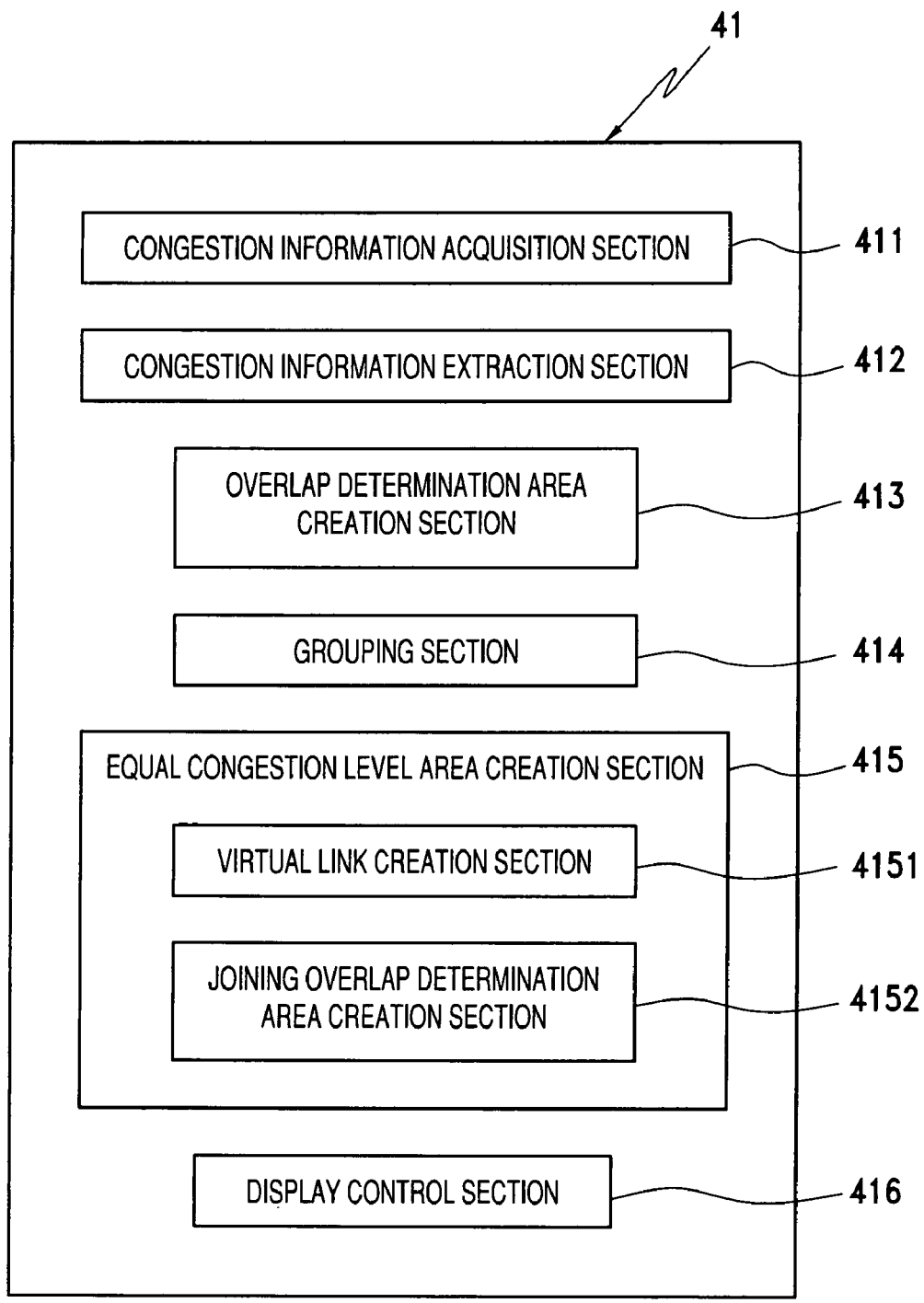
FIG. 1(A) is a functional block diagram of the CPU in FIG. 1(A)

As shown in FIG. 1, the navigation system 1 according to this first embodiment includes a current position detection processing section 11, a data storage section 12, a navigation control section 13, an operation section 14, a liquid crystal display 15, a speaker 16, and a communications unit 17. The current location detection section 11 detects a current position of a host vehicle (hereinafter "host vehicle location"). The data storage section 12 stores various types of data. The navigation control section 13 executes various types of computational processing based on input information. The operation section 14 receives operations from the driver. The liquid crystal display 15 displays information such as maps and the like for guidance. The speaker 16 outputs, by voice, route guidance, traffic restriction information (described later), and congestion information. The communications unit 17 provides communication with an information center such as the road traffic information center (VICS®) 3. Also, a vehicle speed sensor 21 that detects running speed of the host vehicle is connected to the navigation control section 13.

Figure 2:
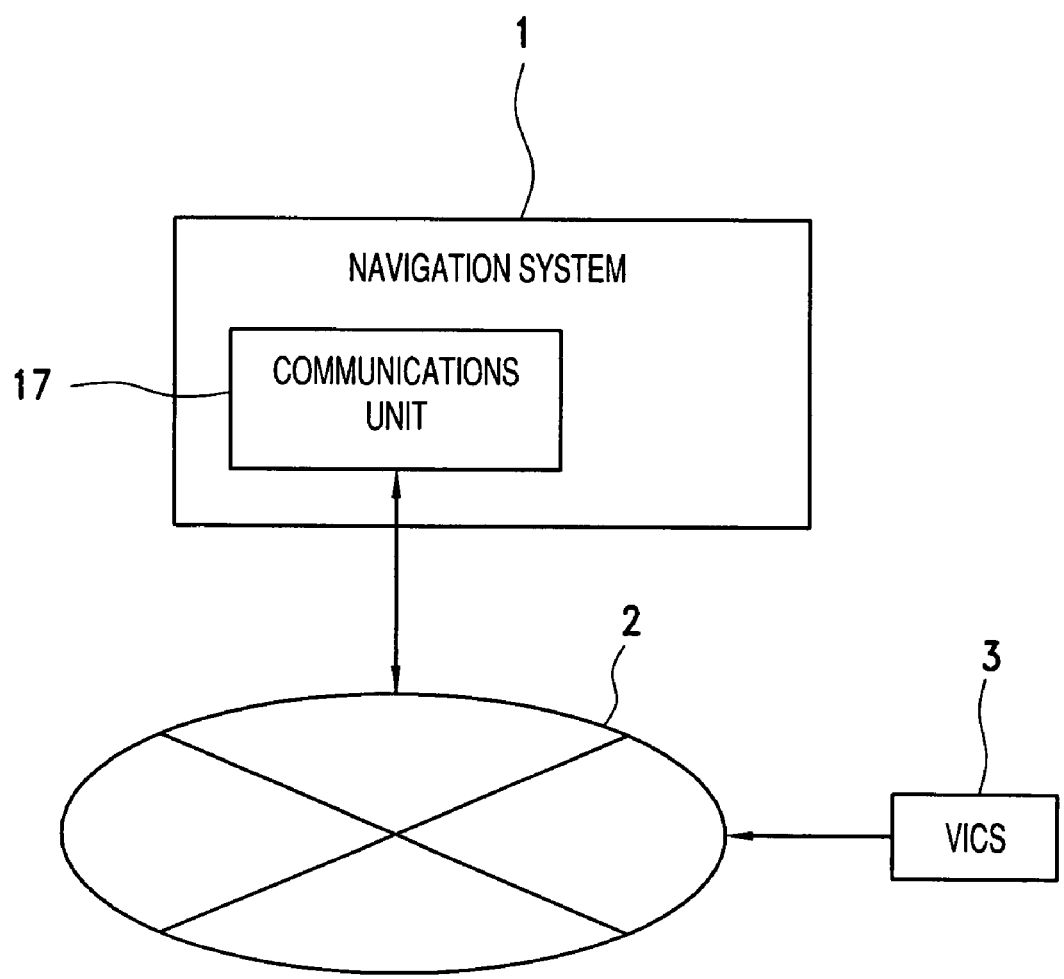
FIG. 2 is a diagram illustrating communication between the navigation system and a road traffic information center (VICS®)

As shown in FIG. 2, the navigation system 1 is connected to the road traffic information center (VICS®) 3 via a network 2. The navigation system 1 is configured such that it can receive road traffic information from the road traffic information center (VICS®) 3 via the network 2 at specified time intervals. The road traffic information includes information related to road congestion, which is created based on information gathered from the police, the traffic control systems of the Japan Highway Public Corporation, and the like, as well as traffic restriction information. For example, the road traffic information may be detailed information such as road congestion information about road congestion, traffic restrictions due to road work, construction work, or the like, and other road traffic information. The detailed road congestion information includes a VICS® link ID, described later, actual length of the congested section, a congestion level (ranked as not congested, busy, congested, or the like), vehicle speed within the congested section, travel time, direction of travel in a congested lane, an estimated time for an end to the congestion, and the like. The detailed traffic restrictions information includes the VICS® link ID, described later, the time period scheduled for the road work, construction work, or the like, types of traffic restrictions, such as a closed road, alternating directions of traffic in a lane, lane restrictions, time periods for traffic and lane restrictions, and the like.

Communications systems that can be used as the network 2 include, for example, a local area network (LAN), a wide area network (WAN), an intranet, a mobile telephone network, a land-line telephone network, a public communications network, a dedicated communications network, the Internet, and the like. The communications system can also be one that uses communications satellite broadcasting or broadcast satellite broadcasting, digital terrestrial television broadcasting, or FM multiplex broadcasting. A communications system such as a non-stop electronic toll collection (ETC) system, a dedicated short-range communication (DRSC) system, or the like used in Intelligent Transportation Systems (ITS), can also be used.

FIG. 1 shows the components that make up the current position detection processing section 11 as including a GPS 31, a geomagnetic sensor 32, a distance sensor 33, a steering sensor 34, a gyroscopic sensor 35 as a direction detector, an altimeter (not shown), and the like. The current position detection section 11 is thus capable of detecting the current host vehicle location, vehicle direction, distance to a target point (for example, an intersection), and the like.

Specifically, the GPS 31 detects the current host vehicle location, as well as the current time, by receiving radio signals transmitted from an artificial satellite. The geomagnetic sensor 32 detects the host vehicle's direction by measuring geomagnetism. The distance sensor 33 detects the distance between specified locations on the road. The distance sensor 33 can be, for example, a sensor that measures rotary speed of a wheel of the host vehicle and then computes a distance based on the measured rotary speed, or the distance sensor 33 can be a sensor that measures acceleration and then computes a distance by integrating the acceleration twice.

The steering sensor 34 detects the steering angle of the host vehicle. The steering sensor 34 can be, for example, an optical rotation sensor or potentiometer that is attached to a rotary element of the steering system, e.g. the steering wheel, an angle sensor attached to a wheel, or the like.

The gyroscopic sensor 35 detects the angle of rotation of the host vehicle and can be, for example, a gas rate gyroscope, a vibration gyroscope, or the like. The direction of the host vehicle can be detected by integrating the angle of rotation that is detected by the gyroscopic sensor 35.

The data storage unit 12 includes a hard disk, which serves as an external storage system and storage medium, a traffic information database 22, which is stored on the hard disk, a map information database 25, and a recording head, which reads specified programs and the like and writes specified data onto the hard disk. While a hard disk is described here as the external storage system and storage medium for the data storage section 12, a magnetic disk such as a flexible disk or the like can be used as the external storage system instead of the hard disk. A memory card, a magnetic tape, a magnetic drum, a CD, an MD, a DVD, an optical disk, a magneto-optical disk, a smart card, an optical card, or the like can also be used as the external storage system.

Congestion information 23 is stored in the traffic information database 22. The congestion information 23 is created from road traffic information pertaining to current road congestion, this information being made up of the actual length of the congested section, the congestion level (ranked as not congested, busy, congested, or the like), the vehicle speed within the congested section, the travel time, the direction of travel in the congested lane, the estimated time for the congestion to clear, and the like, all received from the road traffic information center (VICS®) 3. Traffic restrictions information 24 is also stored in the traffic information database 22 and is created from road traffic information pertaining to traffic restrictions due to road work, construction work, and the like, the information being received from the road traffic information center (VICS®) 3.

The VICS® link ID is included in each item of road traffic information received from the road traffic information center (VICS®) 3, along with information such as classification information, position, length of a congested section, congestion level, and the like. The VICS® link ID is an identification number that is assigned to VICS® links, which are divided by specified intersections on roads and serve as standardized links for driving guidance purposes. Note that the road traffic information includes information such as the coordinates of a starting point and an ending point for each VICS® link, the distance from the starting point to the ending point, and the like.

Here, a road (link) that is stored in the map information database 25 and a VICS® link are not the same thing. Generally, the roads (links) are divided into shorter lengths than are the VICS® links. Accordingly, the traffic information database 22 includes a conversion table (a comparison table) for correlating each link ID that is assigned as an identification number for a road (a road link) with a VICS® link ID, so that, based on the VICS® link ID, the corresponding link IDs can be determined. Therefore, when the navigation system 1 receives a VICS® link ID from the road traffic information center (VICS®) 3, the navigation system 1 can specify, based on the VICS® link ID, a section of road for which road traffic information, such as congestion information, should be displayed. The VICS® link ID for the road traffic information received from the road traffic information center (VICS®) 3 that pertains to current road congestion is converted to a link ID and stored as congestion information 23. Also, the VICS® link ID for the road traffic information received from the road traffic information center (VICS®) 3 that pertains to traffic restrictions is converted to a link ID and stored as traffic restriction information 24.

Navigation map information 26, which the navigation system 1 uses for driving guidance and route searching, is stored in the map information database 25. The navigation map information 26 includes various types of information required for route guidance and map displays, including, for example, newly built road information for each newly built road, map display data for display of maps, intersection data for each intersection, node data for each node, link data for each road (road link, which is one type of "facility"), search data for searching for a route, point-of-interest (POI) data for points of interest such as shops and the like ("facilities"), search data for searching for a location, and so on.

The content of the map information database 25 is updated by using the communications unit 17 to download update data that is transmitted from a map information transmission center (not shown in the drawings).

The map display data is partitioned into two-dimensional meshes measuring 10 kilometers by 10 kilometers, and each mesh is then further divided into units that are one-fourth (side length=½), one-sixteenth (side length=¼), and one-sixty-fourth (side length=⅛) the size of the basic mesh unit. The units are established for individual areas such that the volume of data for each unit is roughly the same. The smallest unit is the one-sixty-fourth unit, which represents approximately 1.25 kilometers on a side (one dimension).

The node data includes branching points in a road (including a four-way intersection, T intersection, and the like), node point coordinates (position), which are set at specified intervals according to the radius of curvature of each road, a node attribute which indicates, for each node, whether the node corresponds to an intersection or other feature, a connecting link numbers list, which is a list of the link IDs that are the identification numbers of links that connect to a node, an adjoining node numbers list, which is a list of node numbers of nodes that are joined to a node via links, data indicating the elevation of the node, and the like.

The link data include data for each road link (hereinafter "link") that makes up a road. For each link, the data indicates the road width, slope, cant, bank, surface condition, number of lanes, locations where the number of lanes decreases, places where the road width decreases, railroad crossings, and the like. For a corner, the data indicates the radius of curvature, intersection, T-intersecting roads, entrance to and exit from the corner, and the like. For road attributes, the data identifies a downhill grade or an uphill grade. The road type data indicates an ordinary road, such as a federal (or national) road, a state road, a narrow street, or a toll road. Each toll road is further identified as a federal expressway, a metropolitan expressway, an ordinary toll road, a toll bridge, or the like. For toll roads, the data also includes information on access roads (ramps) at expressway entrances and exits, toll collection points (interchanges), and the like.

The search data is data used to search for and display a route to a set destination. The search data includes data used to compute a search cost which includes the cost of passing through a node (hereinafter "node cost"), the cost of a link that is a component of a road (hereinafter "link cost"), and the like. The search data also includes route display data for displaying a guidance route, which is selected by route searching, in the map displayed on the liquid crystal display 15.

The POI data includes data pertaining to points of interest such as hotels, hospitals, gas stations, parking lots, tourist facilities, and the like in each region, each POI being stored along with an identifying number. Voice output data is also stored in the map information database 25 for the purpose of outputting specified information through the speaker 16 of the navigation system 1.

As shown in FIG. 1, the navigation control portion 13 of the navigation system 1 includes a CPU 41, internal storage units such as a RAM 42, a ROM 43, a flash memory 44, a timer 45, and the like. The CPU 41 serves as a computation unit and a control unit that executes overall control of the navigation system 1. The RAM 42 is used as a working memory when the CPU 41 executes any of various types of computations, and when route searching is executed. The RAM 42 also stores route data, link IDs for congestion information (described later), and the like. The ROM 43 stores control programs, as well as a congestion information display program (refer to FIG. 3) that displays congestion information as guidance when the scale of a display map is reduced to, for example, 1/100,000, for a wide area display (for example, a display of an entire metropolitan area). The flash memory 44 stores a program that is read from the ROM 43. The timer 45 measures time. Note that a semiconductor memory, magnetic core, or the like may be used for the RAM 42, the ROM 43, and the flash memory 44. Also, a microprocessor unit or the like can be used instead of the CPU 41 as the computation unit and the control unit.

In this embodiment, various types of programs are stored in the ROM 43, and various types of data are stored in the data storage. However, it is also possible to read the programs and data from the same external storage system, memory card, or the like and to write the programs, data, and the like into the flash memory 44. It is also possible to update the programs and data by replacing the memory card or the like.

Also, each of the peripheral devices (actuators) that constitute the operation section 14, the liquid crystal display 15, the speaker 16, and the communications unit 17, is electrically connected to the navigation controller 13.

The operation section (input device or means) 14 is made up of a plurality of operation switches, such as various types of keys, and is operated by the user to correct the current position when starting to drive, to input a departure point as a guidance starting point or a destination as a guidance ending point, and to request, for example, a search for information on facilities. Based on the switch signals that are output by the operation of the switches, the navigation controller 13 controls the execution of the corresponding operations. A keyboard, a mouse, a bar code reader, a remote control unit, a joystick, a light pen, a stylus pen, or a touch panel on the face of the liquid crystal display 15 can also be used as the input device 14.

The liquid crystal display 15 displays operational guidance, menus, key guidance, a guidance route from the current position to a destination, guidance information along the guidance route, traffic information, news, weather forecasts, the time, e-mail, television programs, and the like. Note that a CRT display, a plasma display, or the like can be used instead of the liquid crystal display 15, as can a hologram unit that projects a hologram onto the front windshield of the vehicle.

The speaker 16 outputs voice guidance for driving along the guidance route and congestion information, based on instructions from the navigation controller 13. For example, the guidance may be "Turn right 200 meters ahead at XX intersection," "3 kilometers of congestion ahead," or the like. Note that in addition to a synthesized voice, the sounds output from the speaker 16 can be various sound effects or various types of guidance information that are pre-recorded, e.g. on tape, in memory.

The communications unit (receiving section) 17 is a beacon receiver that receives road traffic information as radio beacon signals, optical beacon signals, or the like from radio beacon units, optical beacon units, etc., disposed along a road. The road traffic information is made up of various items of information transmitted from an information center such as the road traffic information center (VICS®) 3, including congestion information, traffic restriction information, parking lot information, traffic accident information, and traffic volume in a service area. The communications unit 17 provides communication via a communications network 2, such as a LAN, a WAN, an intranet, a mobile telephone network, a land-line telephone network, a public communications network, a dedicated communications network, the Internet, or the like. The communications unit 17 also includes an FM receiver that receives FM multiplex information as an FM multiplex broadcast via an FM broadcasting station providing news, weather forecasts, and the like, in addition to information from the road traffic information center (VICS®) 3. While the beacon receiver and the FM receiver are shown as integrated into a single unit that serves as a VICS® receiver, they may also be separate units.

Referring to FIGS. 3 to 9, a congestion information display routine will be explained, which routine is executed when the display of map information is at a scale reduced to a specified level or less (for example, to a scale of 1/100,000). This congestion information display routine is stored in the RAM 42 or the ROM 43 and executed by the CPU 41 in the navigation system 1.

Figure 3:
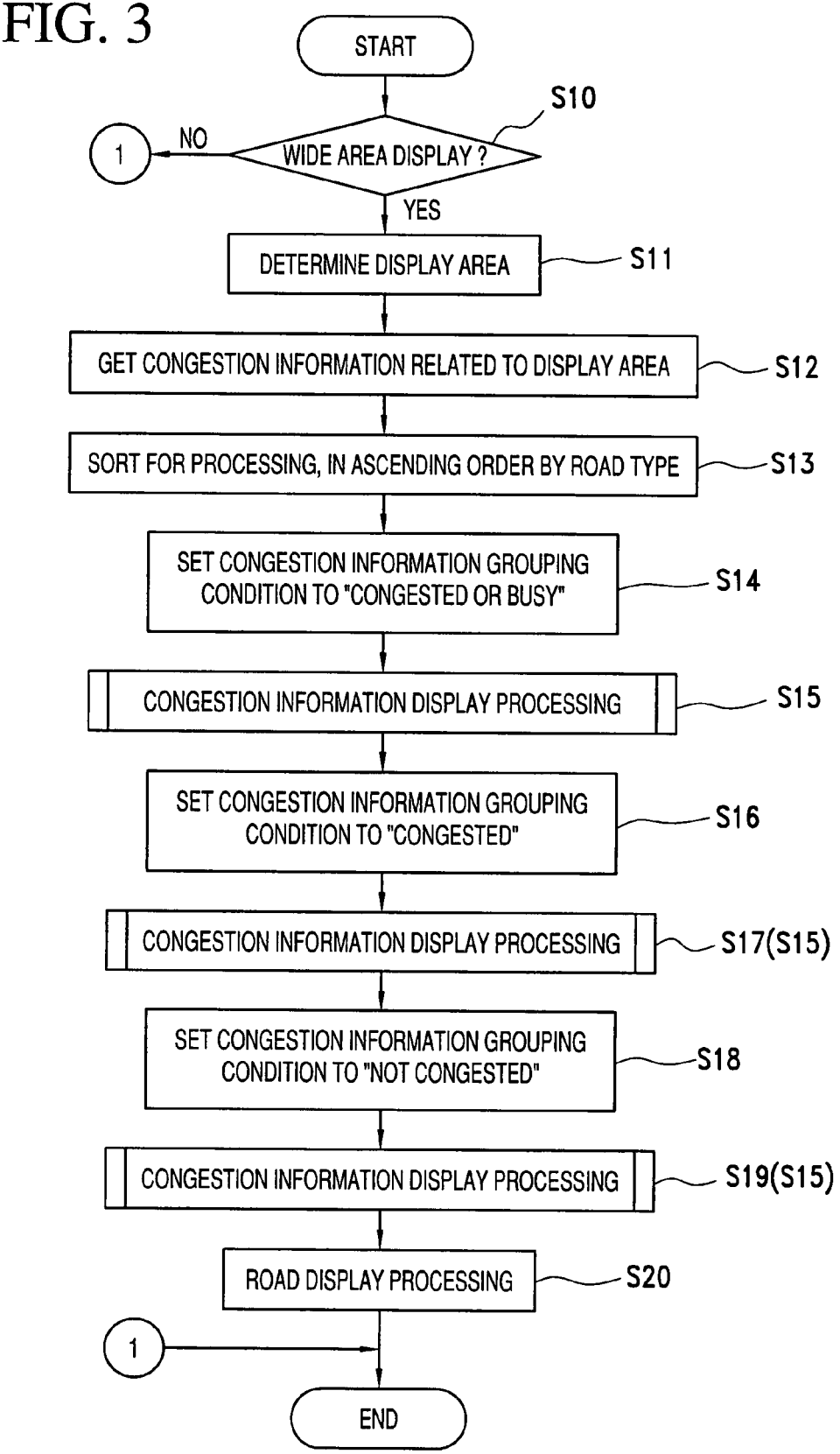
FIG. 3 is a main flowchart of a congestion information display routine (program) that the navigation system executes for display of congestion information when the map display area is a wide area display reduced to a specified scale or smaller.

As shown in FIG. 3, first, at step (hereinafter "S") 10, the CPU 41 determines whether or not the display area for map information is a wide area display (for example, a display of an entire metropolitan area) at a scale that is reduced to a specified level or smaller (for example, to a scale of 1/100,000). If the display area for map information is reduced to a scale larger than the specified level (for example, a scale of 1/80,000) (NO at S10), the CPU 41 ends execution of the routine.

On the other hand, if the display area for map information is reduced to a scale at the specified level or smaller (YES at S10), execution of the routine proceeds to S11. At S11, the CPU 41 determines the area to be displayed on the liquid crystal display 15 as map information in accordance with input through the operation section 14.

At S12, the congestion information acquisition section 411 of the CPU 41 reads, from the congestion information 23 in the traffic database 22, the congestion information for the display area determined at S11 and stores the congestion information in the RAM 42.

At S13, the CPU 41 reads from the RAM 42 the congestion information that was stored at S12. The CPU 41 sorts the congestion information by road type in the order in which the road types will be omitted according to the scale of reduction of the displayed map information, that is, according to the widening of the display range on the liquid crystal display 15. The CPU 41 then again stores the data in the RAM 42.

For example, the data may be sorted such that congestion information pertaining to narrow streets is placed in a first tier, congestion information pertaining to state roads is placed in a second tier, congestion information pertaining to federal (national) roads is placed in a third tier, congestion information pertaining to ordinary toll roads is placed in a fourth tier, congestion information pertaining to metropolitan expressways is placed in a fifth tier, and congestion information pertaining to federal (national) expressways is placed in a sixth tier, with the information then being stored again in the RAM 42.

Next, at S14, the congestion information extraction section 412 of the CPU 41 sets a grouping condition for grouping the congestion information to "congested" or "busy". That is, the CPU 41 groups the congestion information to which a congestion level of "congested" or "busy" has been assigned, creates an equal congestion level area 61A (refer to FIG. 9) that represents that area within the distribution of the congestion where the congestion is maximum, and decides to display it. For example, on an ordinary road, such as a federal road or a state road, the congested area may be an area where the vehicle speed is in the range of zero km/h to less than 20 km/h. On a metropolitan expressway, it may be an area where the vehicle speed is in the range of zero km/h to less than 40 km/h. On a federal expressway, it may be an area where the vehicle speed is in the range of zero km/h to less than 60 km/h.

Figure 4:
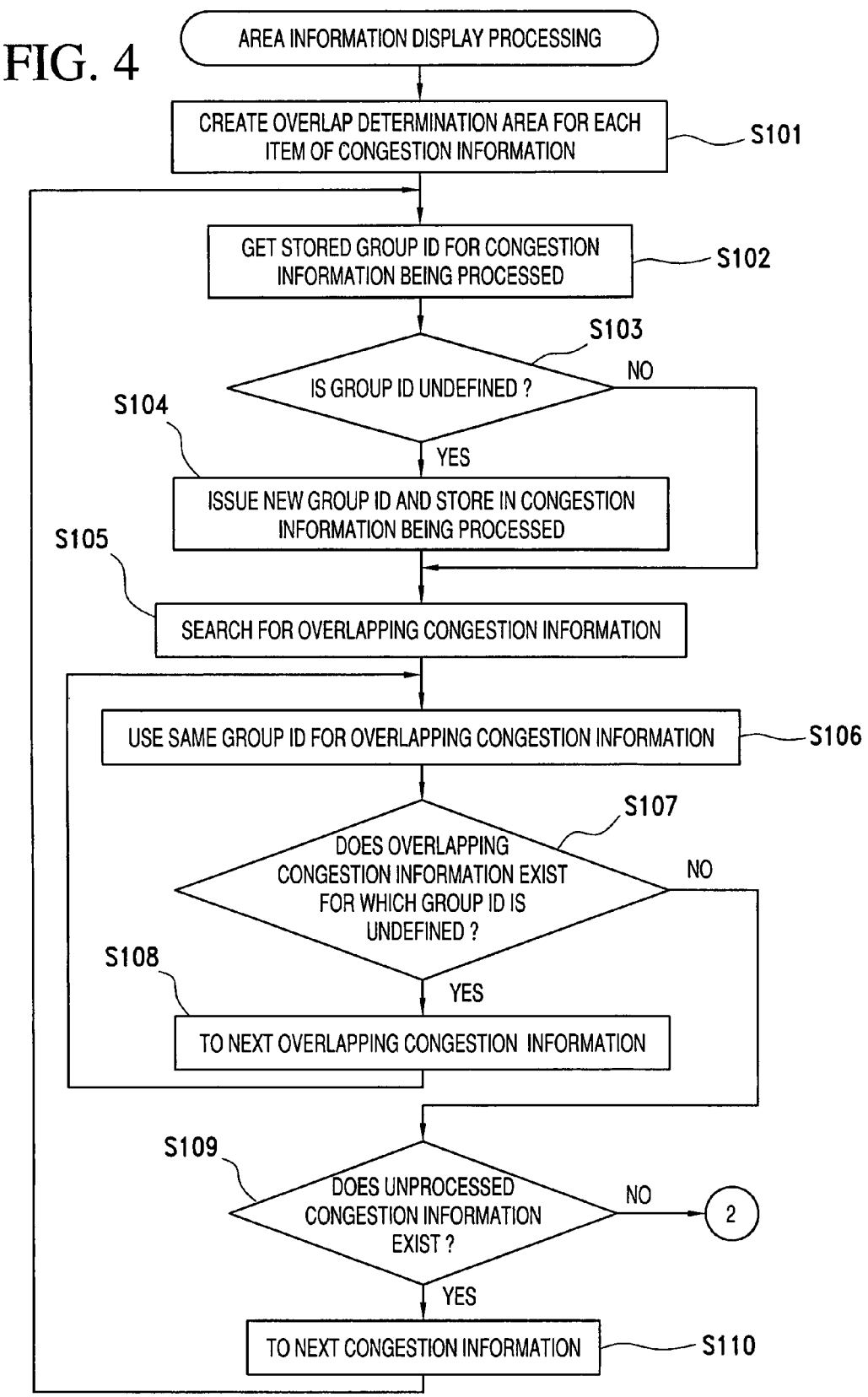
FIG. 4 is a flowchart of a sub-routine for area information display in the routine of FIG. 3.
Figure 5:
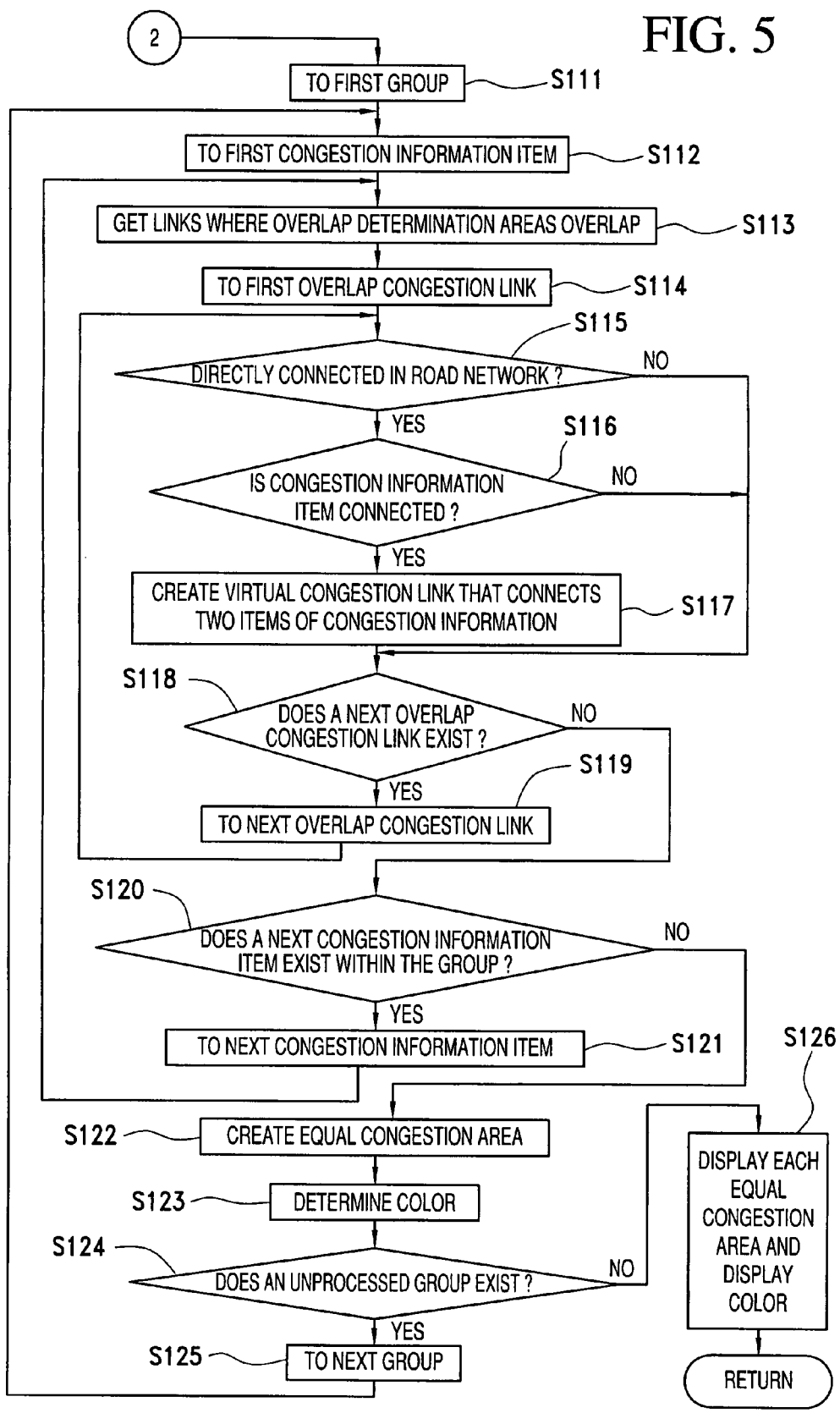
FIG. 5 is a continuation of the flowchart of FIG. 3.

Next, at S15, the CPU 41 executes the sub-routine for area information display (FIGS. 4 and 5). Execution of the sub-routine for area information display results in display of the equal congestion level area 61A, which represents an area where the congestion level is "congested or busy", in a specified color (orange, for example) on the liquid crystal display 15.

Next, at S16, the CPU 41 sets the grouping condition for grouping items of congestion information within a group of areas or road lengths flagged "congested". That is, the CPU 41 groups the items of congestion information to which a congestion level of "congested" has been assigned, creates an equal congestion level area 61B (refer to FIG. 9) that represents a central area of the distribution of the congestion, and decides to display it. For example, on an ordinary road, such as a federal road or a state road, the congested area may be an area where the vehicle speed is in the range of zero km/h to less than 10 km/h. On a metropolitan expressway, it may be an area where the vehicle speed is in the range of zero km/h to less than 20 km/h. On an interstate expressway, it may be an area where the vehicle speed is in the range of zero km/h to less than 40 km/h.

Next, at S17, the CPU 41 executes the sub-routine for area information display (FIGS. 4 and 5). The sub-routine for area information display provides a display of the equal congestion level area 61B, which shows the area where the congestion level is "congested", in a specified color (red, for example), on the liquid crystal display 15. Thus, for example, the red equal congestion level area 61B is displayed superimposed on the orange equal congestion level area 61A to show the distribution of the "congested" and "busy" congestion levels.

Next, at S18, the CPU 41 sets the grouping condition for grouping items of congestion information as "not congested". That is, the CPU 41 groups the items of congestion information to which a congestion level of "not congested" has been assigned, creates an equal congestion level area 61C (refer to FIG. 9) that shows a central area for the distribution of the congestion, and decides to display it. For example, on a road such as a federal road or a state road, the congested area may be an area where the vehicle speed is in the range of 20 km/h to less than 30 km/h. On a metropolitan expressway, it may be an area where the vehicle speed is in the range of 40 km/h to less than 50 km/h. On a federal interstate expressway, it may be an area where the vehicle speed is in the range of 60 km/h to less than 70 km/h.

Next, at S19, the CPU 41 executes the sub-routine for area information display (refer to FIGS. 4 and 5), which will be described later. The sub-routine for area information display generates a display of the equal congestion level area 61C, which shows the area where the congestion level is "not congested" in a specified color (blue, for example) on the liquid crystal display 15.

Next, at S20, the CPU 41 reads map information from the map information database 25 for each road type to be displayed for the scale of reduction of the display area, displays the information on the liquid crystal display 15, and ends the routine.

Next, the sub-routine for an area information display, executed at S15, S17, and S19, will be explained with reference to FIGS. 4 and 5.

As shown in FIGS. 4 and 5, first, at S101, the overlap determination area creation section 413 of the CPU 41 reads from the RAM 42 the congestion information for the congestion levels of the different groupings, in the order in which the congestion information was sorted at S13. The CPU 41 extracts the congestion information group for the congestion level that was set as the grouping condition and stores it in the RAM 42. Next, the CPU 41 reads from the RAM 42 individual items of congestion information that make up the extracted congestion information group. For example, at S15, the items of congestion information are those grouped as "congested or busy". At S17, the items of congestion information are those grouped as "congested". At S19, the read items of congestion information are those grouped as "not congested". The CPU 41 then creates an overlap determination area for each item of congestion information, the overlap determination area extending both transversely and longitudinally, for a specified distance (for example, approximately 300 to 700 meters), from a link (hereinafter called a congestion link) which is the subject of the item of congestion information. The CPU 41 stores the overlap determination areas in the RAM 42 in association with the individual items of congestion information.

Figure 6:
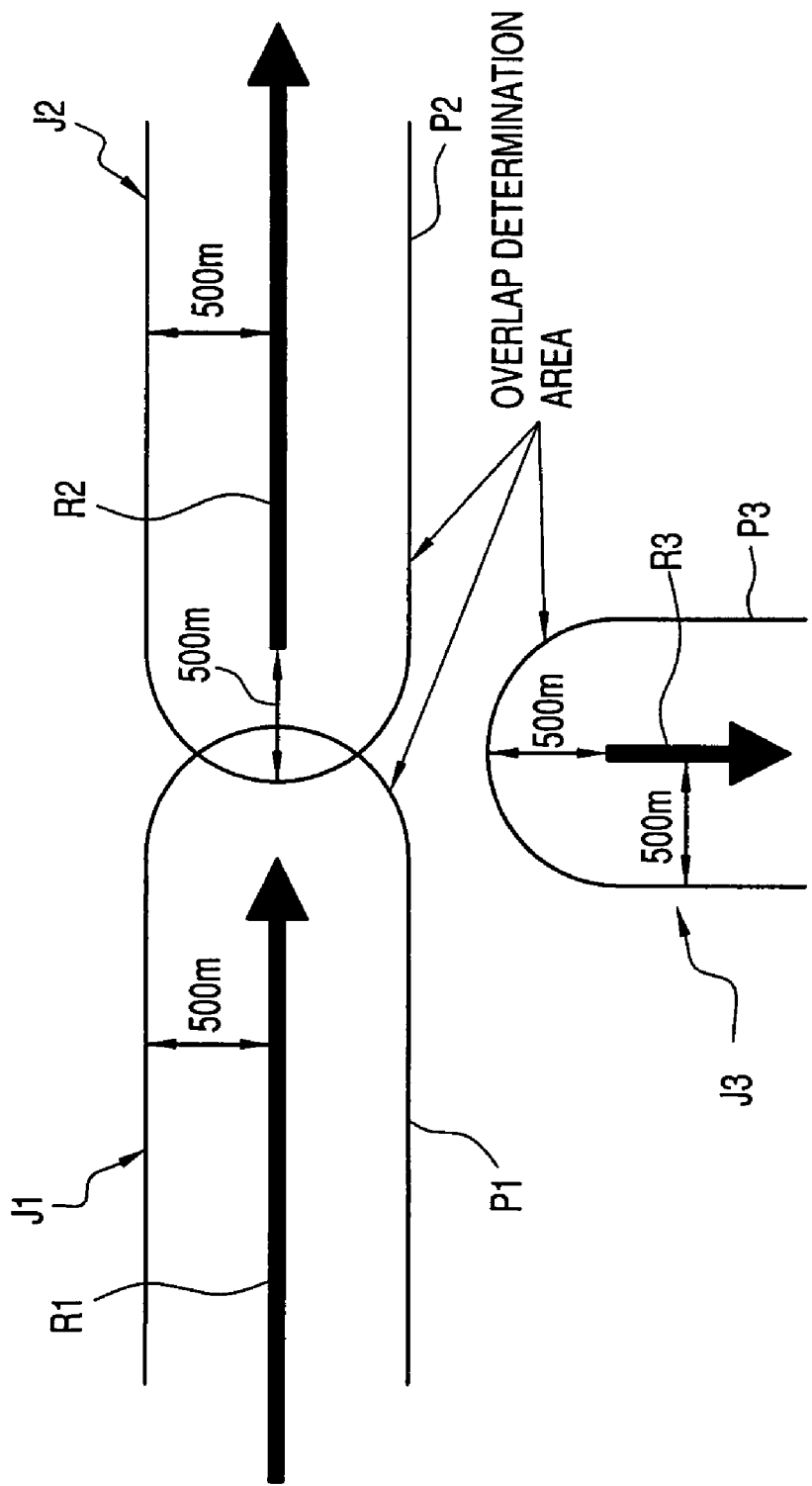
FIG. 6 is a diagram illustrating transition from step S115 directly to step S116 in FIG. 5.

For example, as shown in FIG. 6, the CPU 41 creates a overlap determination area P1 that extends in both transversely and longitudinally for approximately 500 meters from a congestion link R1, R1 being associated with a congestion information item J1. The congestion information item J1 is within a congestion information grouping flagged "congested or busy". The CPU 41 stores the overlap determination area P1 in the RAM 42 in association with the congestion information item J1. In the same manner, the CPU 41 creates a overlap determination area P2 that extends both transversely and longitudinally for approximately 500 meters from a congestion link R2, which is associated with the item of congestion information J2. The congestion information item J2 is within the congestion information grouping designated "congested or busy". The CPU 41 stores the overlap determination area P2 in the RAM 42 in association with the congestion information item J2. In the same manner, the CPU 41 creates an overlap determination area P3 that extends both transversely and longitudinally for approximately 500 meters from a congestion link R3, which is associated with congestion information item J3. The congestion information item J3 is in the congestion information group designated "congested or busy". The CPU 41 stores the overlap determination area P3 in the RAM 42 in association with the congestion information item J3.

In this embodiment, each of the overlap determination areas is created such that it extends both transversely and longitudinally for a specified distance (for example, approximately 500 meters) from a congestion link, but the overlap determination areas may also be created as follows for better matching with the traffic information.

(1) In the case of a basically straight road (a nearly straight road that bends less than 15 degrees to the left or right), the overlap determination areas may extend farther in the longitudinal direction than the specified distance in the transverse direction for each congestion link (for example, approximately 500 meters transversely and approximately 800 meters longitudinally).

(2) The overlap determination areas may extend farther in the direction of connecting roads in a road network. For example, at a point where two federal roads connect, the overlap determination area may extend farther beyond the congestion link in the direction of the road.

(3) The overlap determination areas may be created such that the distances they extend from the congestion links in both the transverse and longitudinal directions differ in accordance with the road type (an interstate expressway, a metropolitan expressway, a toll road, a federal road, or a state road). For example, the overlap determination areas on an interstate expressway may extend, for example, 700 meters from the congestion links both transversely and longitudinally. The overlap determination areas for other federal roads may extend a lesser distance of 500 meters from the congestion links both transversely and longitudinally. The overlap determination areas on a state road may extend a yet shorter distance, e.g. 300 meters, both transversely and longitudinally of the congestion links.

(4) The overlap determination areas may extend from the congestion links both transversely and longitudinally by distances which differ according to the congestion levels. For example, when the congestion level is "congested or busy", the distance may be set to 500 meters, and when the congestion level is "congested", the distance may be set to 800 meters.

(5) The overlap determination areas may expand or contract according to the congestion level in an oncoming traffic lane. For example, if the congestion level in the oncoming traffic lane is "congested", the distance for the congestion link may be set to one-half its normal value in both the transverse and longitudinal directions.

(6) The overlap determination areas may extend from the congestion links both transversely and longitudinally by distances which change according to the scale of reduction in the map information display. For example, when the scale of reduction is 1/100,000, the overlap determination areas might extend, for example, 500 meters from the congestion links both transversely and longitudinally. When the scale of reduction is 1/250,000, the overlap determination areas would then extend 1000 meters from the congestion links both transversely and longitudinally.

(7) When the route searching for a route from the host vehicle location to the destination is according to the Dijkstra method, and a cost is assigned to each node, the direction from the host vehicle location to the destination is assigned to each link that connects to each node. In such an embodiment, the overlap determination areas may extend from the congestion links both transversely and longitudinally by distances which change according to the congestion information for a congestion link lane in the direction that is assigned to the congestion link, and need not be created for a congestion link lane in the direction opposite the direction assigned. It is thus possible to display, on the liquid crystal display 15, only that information for congestion in the direction of the host vehicle's destination.

Next, at S102, first, the CPU 41 reads from the RAM 42 the first tier of the item of congestion information within the group that was stored at S101. The CPU 41 reads a group identification code (hereinafter "group ID") that is stored in the congestion information and stores it in the RAM 42. Note that when the system is started, a value of "00" is stored as the group ID for each congestion information item to indicate that the group ID has not been defined.

Next, at S103, the CPU 41 reads the group ID from the RAM 42 and determines whether or not the group is undefined, that is, whether or not the group ID is "00".

If the group ID is undefined, that is, if the group ID is "00" (YES at S103), the CPU 41 proceeds to S104. At S104, the CPU 41 assigns the group ID to the congestion information for which the group ID is undefined, then proceeds to S105. That is, the CPU 41 stores a value of "01", which indicates an association with the first group, as the group ID for the congestion information. The CPU 41 sequentially stores in the RAM 42 the type of group ID it assigns to each congestion information item.

On the other hand, if the group ID is already defined, that is, if the group ID is not "00" (NO at S103), the CPU 41 proceeds to S105.

Next, at S105, the CPU 41 reads from the RAM 42 the overlap determination area that corresponds to the congestion information read at S102. The CPU 41 then searches for overlap determination areas that overlap this overlap determination area.

For example, as shown in FIG. 6, the CPU 41 searches for and finds the overlap determination area P2, which overlaps the overlap determination area P1 that corresponds to the congestion information item J1.

At S106, the CPU 41 stores the value "01", the group ID for the first group, as the group ID for the congestion information that corresponds to the overlap determination areas that were found at S105.

For example, as shown in FIG. 6, the CPU 41 stores a value of "01", which indicates an association with the first group, as the group ID for the congestion information item J2, which corresponds to the overlap determination area P2.

Filtering may be executed according to the actual length of the congested section, the congestion level (ranked as not congested, busy, congested, or the like), or the travel time, all found in the congestion information. Where the actual length of the congested section is less than 100 meters, for example, the value of "01" may not be stored as the group ID. That is, the congestion information for that section may be excluded from grouping. This makes it possible to delete congestion information that is due to sensor measurement errors and the like.

Next, at S107, the grouping section 414 of the CPU 41 determines whether or not, in the congestion information group that was stored at S101, there is congestion information for which the group ID is undefined, that is, congestion information for which the group ID is stored as "00", and whether or not the congestion information is for an overlap determination area that overlaps the overlap determination areas that correspond to the congestion information for which group IDs were stored at S104 and S106.

For example, the grouping section 414 determines whether or not a group ID of "00" is stored for that item of congestion information and whether or not the congestion information is for an overlap determination area that overlaps the overlap determination areas P1 and P2 shown in FIG. 6, which are for the respective items of congestion information J1 and J2 and which have been given the group ID "01" (first group).

If congestion information exists for the congestion information group that was stored at S101 for which the group ID is undefined, that is, for which a group ID of "00" is stored, and the congestion information corresponds to a next overlap determination area that overlaps the overlap determination areas that correspond to the congestion information for which group IDs were stored at S104 and S106 (YES at S107), execution proceeds to S108. At S108, the grouping section 414 reads from the RAM 42 the congestion information for the next overlap determination area and once more executes the routine from S106 onward. In this manner, the same group ID is stored for the congestion information for each of a series of overlap determination areas that sequentially overlap the overlapping determination area that corresponds to the congestion information for which the group ID was stored at S104.

For example, a group ID of "01", which indicates an association with the first group, is stored for the congestion information for an overlap determination area that overlaps the overlap determination areas P1 and P2 shown in FIG. 6 (for the respective congestion information items J1 and J2).

On the other hand, if congestion information exists in the congestion information group which was stored at S101 for which the group ID is undefined, that is, which has been assigned a group ID of "00", but it is congestion information that does not correspond to the next overlap determination area that overlaps the overlap determination areas that correspond to the congestion information for which group IDs were stored at S104 and S106 (NO at S107), the CPU 41 proceeds to the processing at S109.

At S109, the grouping section 414 of the CPU 41 determines whether or not, in the congestion information group that was stored at S101, there is congestion information for which the group ID is undefined, that is, congestion information with group ID "00".

If congestion information exists in the congestion information group that was stored at S101 with an undefined group ID (group ID of "00"), (YES at S109), the execution of the routine proceeds to S110. At S110, the CPU 41 reads congestion information from the first tier of the congestion information group with the undefined group ID. The CPU 41 stores the congestion information in the RAM 42, then returns to S102. At S102, the CPU 41 reads the stored congestion information, reads its stored group ID, then stores the group ID in the RAM 42.

Next, the CPU 41 once more executes the routine from S103 onward. At S104, the CPU 41 adds 1 to the group ID that was assigned in the preceding cycle and stores that value as the group ID for the congestion information.

On the other hand, if congestion information for which the group ID is undefined does not exist in the congestion information group that was stored at S101 (NO at S109), the CPU 41 proceeds to S111. Thus, the CPU 41 sequentially creates an equal congestion level area 61A (refer to FIG. 9) for each group.

At S111, the CPU 41 defines the first group. That is, the CPU 41 stores "01" in RAM 42 as the ID for the congestion information that is subject to processing.

Next, at S112, the CPU 41 reads the processing group ID from the RAM. The CPU 41 then reads, from among the items of congestion information in the congestion information group that was stored at S101, the first congestion information item having a group ID matching the processing group ID.

Next, at S113, the CPU 41 reads the congestion link for each item of congestion information that corresponds to an overlap determination area that overlaps the overlap determination area for the congestion information item that was read at S112. The CPU 41 then stores the links as overlap congestion links in the RAM 42.

For example, as shown in FIG. 6, the CPU 41 reads the congestion links R1, R2, etc. from the congestion information items J1, J2, etc. for the overlapping overlap determination areas P1, P2, and the like. The CPU 41 then stores the congestion links R1, R2, etc. as overlap congestion links in the RAM 42.

Next, at S114, the CPU 41 reads the first overlap congestion link among the overlap congestion links stored in the RAM 42.

Next, at S115, the equal congestion level area creation section 415 of the CPU 41 determines whether or not the overlap congestion link that was read is connected to the next overlap congestion link in a road network, the overlap congestion links being stored sequentially in the RAM 42.

If the overlap congestion link that was read is not connected to the next overlap congestion link in the road network, stored sequentially in the RAM 42 (NO at S115), the CPU 41 proceeds to S118.

On the other hand, if the overlap congestion link that was read is connected to the next overlap congestion link in the road network, stored sequentially in the RAM 42 (YES at S115), the CPU 41 proceeds to S116. At S116, the CPU 41 determines for each item of congestion information, whether or not the corresponding overlap congestion link in the road network is unconnected, that is, whether the congestion link for each item of congestion information item is unconnected.

If the congestion link for the congestion information item is connected (NO at S116), the CPU 41 proceeds to S118.

If the congestion link for the congestion information item is unconnected (YES at S116), the CPU 41 proceeds to S117. At S117, the virtual link creation section 4151 of CPU 41 creates a virtual congestion information item that has a virtual congestion link that connects the unconnected congestion link. The virtual congestion information item is then stored in the RAM 42. The CPU 41 also creates a joining overlap (virtual) determination area, which extends both transversely and longitudinally a specified distance (for example, approximately 300 to 700 meters) from the virtual congestion link. The joining overlap determination area is then stored in the RAM 42. For the group ID of the virtual congestion information item, the CPU 41 stores in the RAM 42 the group ID of the individual congestion information item that is connected to the joining overlap determination area. The CPU 41 then proceeds to S118.

In this embodiment, although the congestion link for each item of congestion information item is connected in the road network and the congestion information items have been determined to be in the same group, if the congestion links for the congestion information items are not continuously connected, when the individual overlap determination areas are connected as created (without a determination area for a virtual link) and the equal congestion level areas 61A, 61B, and 61C are created and displayed for a basically straight road (a nearly straight road that bends less than 15 degrees to the left or right), dips (indentations) will occur in the contours of the congestion information display. Also, if the congestion links for the congestion information items are not continuously connected, when the individual overlap determination areas are connected and the areas of equal levels of congestion 61A, 61B, and 61C, described later, are created and displayed for a road that curves left or right, distortions will occur in the contours of the congestion information display.

At S116 and S117, the virtual congestion information item having the virtual congestion link is created and stored in the RAM 42. Also, the joining overlap determination area, which extends both transversely and longitudinally for a specified distance (for example, approximately 300 to 700 meters) from the virtual congestion link, is created and stored in the RAM 42 in association with the virtual congestion information item by the joining overlap determination area creation section 4152. The individual overlap determination areas are then joined via the joining overlap determination area and the equal congestion level areas 61A, 61B, and 61C, are thereby created and displayed (refer to FIG. 9), without dips (indentations) or distortions.

Figure 7:
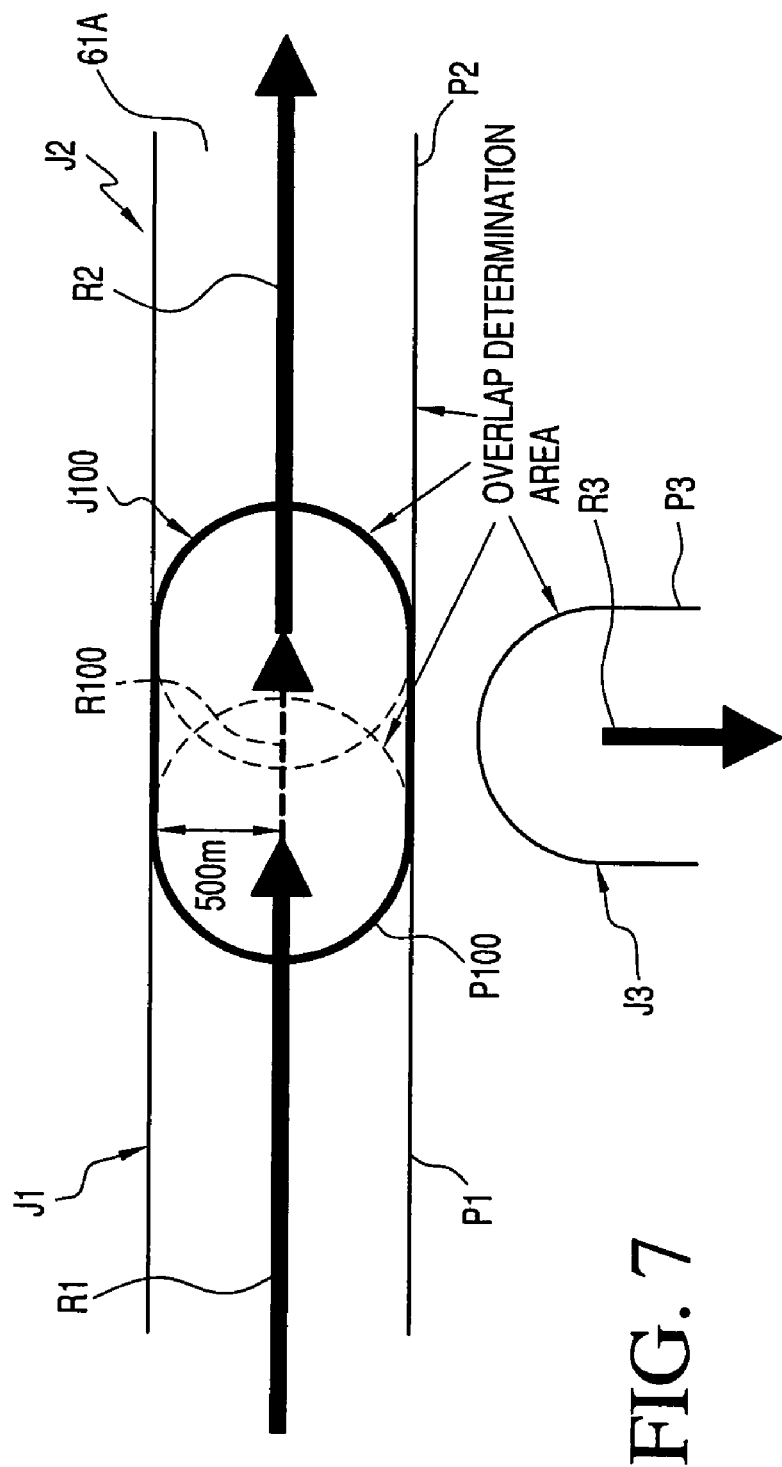
FIG. 7 is a diagram illustrating transition from step S116 directly to step S117 in FIG. 5.

For example, as shown in FIG. 7, the overlap congestion links R1 and R2 for the congestion information items J1 and J2, which respectively correspond to the overlap determination areas P1 and P2, are not connected, but if they are connected on a basically straight road in the road network, a virtual congestion information item J100, which has a virtual congestion link R100 that joins the overlap congestion links R1 and R2, is created and stored in the RAM 42. Also, a joining overlap determination area P100, which extends for 500 meters both transversely and longitudinally of the virtual congestion link R100, is created and stored in the RAM 42 in association with the virtual congestion information item J100.

In other words, because the overlap congestion links R1 and R2 for the congestion information items J1 and J2, which respectively correspond to the overlap determination areas P1 and P2, are not connected, dips (indentations) occur when the overlap determination areas P1 and P2 are connected. However, the creation of the virtual congestion information item J100, which has the virtual congestion link R100 that joins the overlap congestion links R1 and R2, and the creation of the joining overlap determination area P100 make it possible to join the overlap determination areas P1 and P2 smoothly via the joining overlap determination area P100.

Figure 8:
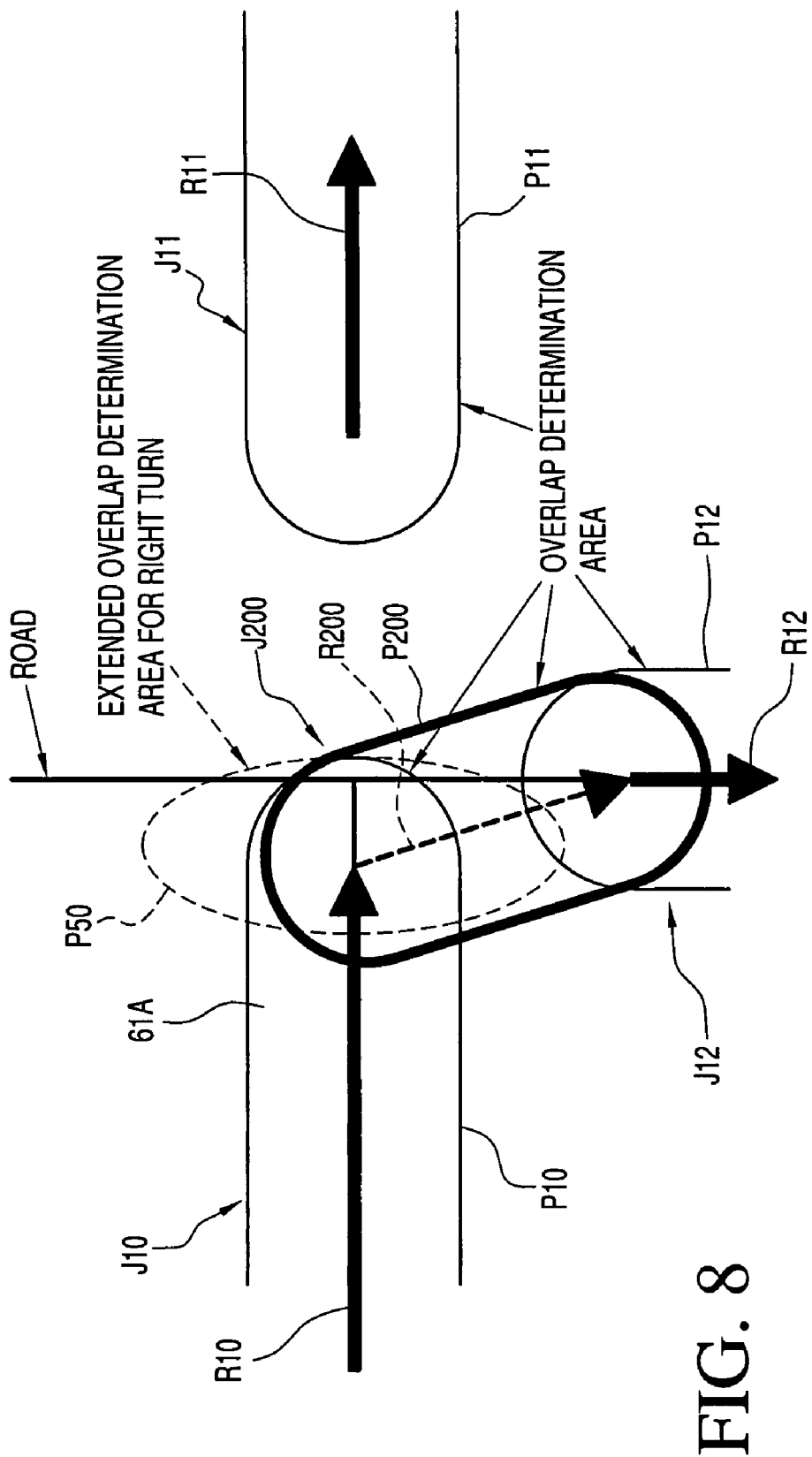
FIG. 8 is a diagram illustrating transition from step S115 directly to step S117 in FIG. 5.

Also, as shown in FIG. 8, for example, overlap congestion links R10 and R12 for congestion information items J10 and J12, which respectively correspond to overlap determination areas P10 and P12, are not connected, but if they represent actually-connected segments of a road that curves to the right in the road network, a virtual congestion information item J200, which has a virtual congestion link R200 that joins the overlap congestion links R10 and R12, is created and stored in the RAM 42. Also, a joining overlap determination area P200, which extends for 500 meters both transversely and longitudinally from the virtual congestion link R200, is created and stored in the RAM 42 in association with the virtual congestion information item J200.

In other words, while the overlap congestion links R10 and R12 for the congestion information items J10 and J12, which respectively correspond to the overlap determination areas P10 and P12, are not connected, because the congestion links are actually connected on a road that curves to the right in the road network, the CPU 41 creates an extended overlap determination area P50, which is elliptical and centered on the forward end of the congestion link R10, and then determines whether or not the extended overlap determination area P50 overlaps the overlap determination area P12. The extended overlap determination area P50 does overlap the overlap determination area P12, so if the overlap determination areas P1 and P2 are connected by the extended overlap determination area P50, a distortion occurs in which a corner portion protrudes on the outer side. Therefore, the CPU 41 creates the virtual congestion information item J200, which has a virtual congestion link R200 that joins the overlap congestion links R10 and R12, and also creates the joining overlap determination area P200, which extends for 500 meters both transversely and longitudinally from the virtual congestion link R200. The CPU 41 then joins the overlap determination areas P10 and P12 smoothly via the joining overlap determination area P200.

Next, at S118, the CPU 41 determines whether or not a next overlap congestion link exists, that is, whether or not a next continuously overlapping overlap determination area exists.

If a next overlap congestion link exists, that is, a next continuously overlapping overlap determination area exists (YES at S118), the CPU 41 proceeds to S119. At S119, the CPU 41 reads the overlap congestion link for the continuously overlapping overlap determination area, then executes the routine from S115 onward. In this manner, each virtual congestion information item, and the joining overlap determination area that corresponds thereto, are created in order to connect, smoothly and in sequence, overlap determination areas that overlap the overlap determination area corresponding to the first overlap congestion link that was set at S114.

On the other hand, if a next continuously overlapping overlap determination area does not exist (NO at S118), the CPU 41 proceeds to S120. At S120, the CPU 41 once more reads the processing group ID from the RAM, then determines whether or not, among the items of congestion information having the processing group ID as its defined group ID, an item of congestion information has not been processed at S113 to S119.

If, among the items of congestion information having the processing group ID, an item of congestion information exists which has not been processed at S113 to S119 (YES at S120), the CPU 41 proceeds to S121. At S121, the CPU 41 reads, from among the items of congestion information defined by the processing group ID, the earliest item of congestion information that has not been processed at S113 to S119, then once more executes the routine from S113 onward. In this manner, each item of virtual congestion information, and the joining overlap determination area and link that corresponds thereto, are created in order to smoothly connect each overlap determination area that corresponds to the overlap congestion link for each item of congestion information defined by the same group ID.

On the other hand, if, among the items of congestion information having the processing group ID, there is no item of congestion information that has not been processed at S113 to S119 (NO at S120), the CPU 41 proceeds to S122. At S122, the CPU 41 reads the processing group ID again, then reads from the RAM 42 each item of congestion information having the processing group ID, as well as each overlap determination area and each joining overlap determination area that corresponds to the item of virtual congestion information. The CPU 41 then joins each overlap determination area and each joining overlap determination area to create an area of equal congestion level, which is then stored in the RAM 42. In this manner, an equal congestion level area is created that corresponds to the congestion information having the processing group ID.

When the overlap determination areas and the joining overlap determination areas are joined to create the equal congestion level area, the angles that are formed in the boundaries of the equal congestion level area may be smoothed using B-spline curves, Bezier curves, or the like.

For example, as shown in FIG. 7, the equal congestion level area 61A is created by joining the overlap determination areas P1 and P2, which correspond to the congestion information items J1 and J2, for which the congestion level is "congested" or "busy", with the joining overlap determination area P100, which corresponds to the virtual congestion information item J100.

Likewise, as shown in FIG. 8, the equal congestion level area 61A is created by joining the overlap determination areas P10 and P12, which correspond to the congestion information items J10 and J12, for which the congestion level is "congested" or "busy", with the joining overlap determination area P200, which corresponds to the virtual congestion information item J200. Each angle in the boundary of the equal congestion level area 61A, which joins the overlap determination areas P10 and P12 with the joining overlap determination area P200, may be smoothed using B-spline curves, Bezier curves, or the like.

Next, at S123, the CPU 41 determines a display color that corresponds to the congestion level that was set as the grouping condition, for use in displaying the created equal congestion level area on the liquid crystal display 15, and the CPU 41 stores that determined color in the RAM 42.

For example, at S15, where the congestion level that was set as the grouping condition is "congested or busy", the CPU 41 determines that orange is the display color for displaying the created equal congestion level area on the liquid crystal display 15 and stores "orange" in the RAM 42. At S17, where the congestion level that was set as the grouping condition is "congested", the CPU 41 determines that red is the display color for displaying the equal congestion level area on the liquid crystal display 15 and stores "red" in the RAM 42. And at S19, where the congestion level that was set as the grouping condition is "not congested", the CPU 41 determines that blue is the display color for displaying the equal congestion level area on the liquid crystal display 15 and stores "blue" in the RAM 42.

Next, at S124, the CPU 41 reads the processing group ID from the RAM 42, then determines whether or not, among the items of congestion information in the congestion information group that was stored at S101, congestion information exists for which the group ID equals 1 plus the processing group ID, that is, whether or not unprocessed congestion information exists in the next group.

If unprocessed congestion information exists in the next group (YES at S124), the CPU 41 proceeds to S125. At S125, the CPU 41 reads the processing group ID, adds 1 to it, stores the result once more as the new processing group ID, then executes the sub-routine from S112 onward. For example, if the processing group ID in the RAM 42 is "01", the CPU 41 adds 1 to it, stores "02" as the processing group ID in the RAM 42, then executes the sub-routine from S112 onward.

In this manner, equal congestion level areas are created in sequence for each group ID among the remaining items of congestion information, and the display color for each created equal congestion level area is determined to indicate the congestion level that was set as the grouping condition.

On the other hand, if unprocessed items of congestion information do not exist in the next group (NO at S124), the CPU 41 proceeds to S126. At S126, the display control section 416 of the CPU 41 reads from the RAM 42 each equal congestion level area and the display color for each, displays them on the liquid crystal display 15, then ends the sub-routine and returns to the main flowchart.

Here, an example of a display screen for showing congestion on a wide area display (1:160,000 scale diagram) at a reduced scale of 1/160,000 will be explained with reference to FIG. 9.

Figure 9:
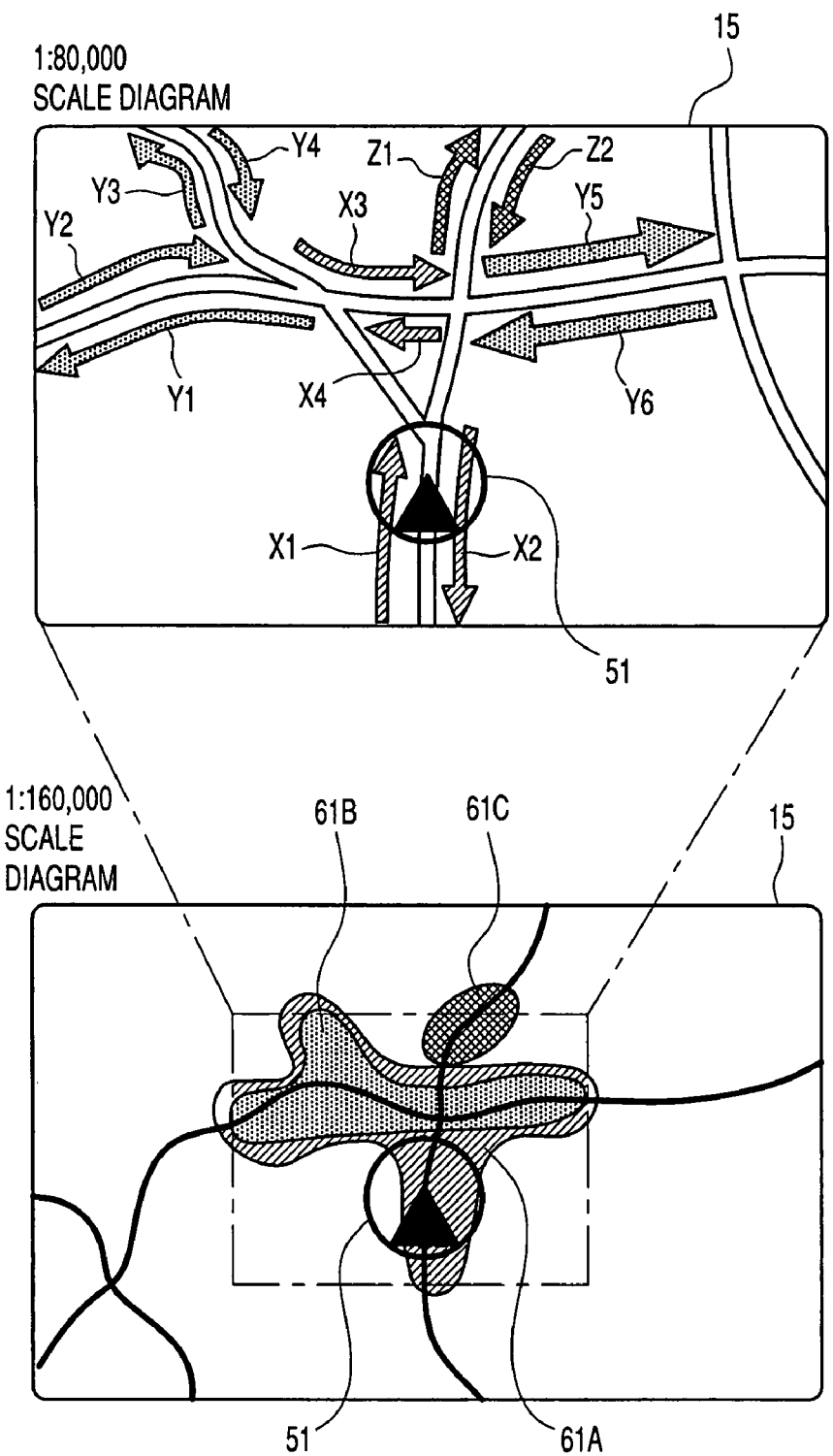
FIG. 9 is a diagram that shows an example of a congestion information display and a wide area display (1:160,000 scale diagram) at a reduced scale of 1/160,000 that is implemented at step S126.

As shown in the upper part of FIG. 9, in a map image (1:80,000 scale diagram) at a reduced scale of 1/80,000 on the liquid crystal display 15, each type road which is displayed at the 1:80,000 scale is shown, along with a vehicle position mark 51 (host vehicle location), shown in the lower middle portion of the screen. Also, to the left and right of and above the vehicle position mark 51, orange arrows X1 to X4 are displayed along various roads to indicate that the congestion level on those roads is "busy". For example, for roads such as federal and state roads, sections would be "busy" where the vehicle speed is zero to 20 km/l; for a metropolitan expressway, a section would be "busy" where the vehicle speed is zero to 40 km/h; and on an interstate expressway, a section where the vehicle speed is zero to 60 km/h. Also, to the left and right of the orange arrows X3 and X4, red arrows Y1 to Y6 are displayed along various roads to indicate that the congestion level is "congested". For example, for a road such as a federal or state road, sections might be defined as "congested" where the vehicle speed is zero to 10 km/h; for a metropolitan expressway, a section might be defined as "busy" where the vehicle speed is zero to 20 km/h; and for an interstate expressway, a section might be defined as "busy" where the vehicle speed is zero to 40 km/h. Also, above the orange arrows X3 and X4, blue arrows Z1 to Z2 are displayed along various roads to indicate that the congestion level is "not congested". For example, "not congested" might be for federal and state roads, where the vehicle speed is 20 to 30 km/h; for a metropolitan expressway might be where the vehicle speed is 40 to 50 km/h; and for an interstate expressway, might be where the vehicle speed is 60 to 70 km/h. Note that as the average vehicle speed in a congested section decreases, the width of the corresponding arrow X1 to X4, Y1 to Y6, or Z1 to Z2 increases.

Also, as shown in the lower part of FIG. 9, when the user, using the input section 14, changes the 1:80,000 scale diagram to a wide area display (1:160,000 scale diagram) with a reduction scale of 1/160,000, the 1:80,000 scale diagram is displayed in scaled-down form in a central portion of the liquid crystal display 15. Also, instead of the arrows X1 to X4, Y1 to Y6, and Z1 to Z2, first, the orange equal congestion level area 61A, in which the congestion level is "congested or busy", is displayed in a form that follows the individual roads. Next, the red equal congestion level area 61B, in which the congestion level is "congested", is displayed, superimposed on the equal congestion level area 61A in a form that follows the individual roads. Next, the blue equal congestion level area 61C, in which the congestion level is "not congested", is displayed in a form that follows the individual roads. Next, the individual roads are displayed in the 1:160,000 scale diagram by road type (an interstate expressway, a metropolitan expressway, toll road, federal road, state road, or narrow street), superimposed on the equal congestion level areas 61A. 61B, and 61C, and the vehicle position mark 51 is displayed in the central portion of the screen.

As explained in detail above, in the navigation system 1 according to this embodiment, when the display area for the map information is reduced to a specified scale (for example, to a scale of 1/100,000) or smaller for a wide area display (for example, a display of an entire metropolitan area), first, the CPU 41 extracts, from the congestion information relating to the map information display area that will be displayed on the liquid crystal display 15, those items of congestion information for which the congestion level is "congested or busy". The CPU 41 then creates an overlap determination area that extends both transversely and longitudinally for a specified (predetermined) distance from the congestion link for each extracted item of congestion information (S101). Also, the CPU 41 groups the congestion information items whose overlap determination areas overlap and creates, for each group, an equal congestion level area by joining the overlap determination areas. The equal congestion level area is displayed on the liquid crystal display 15 in a display color (for example, orange) that corresponds to the congestion level of "congested or busy" (S14 to S15). Next, the CPU 41 extracts, from the items of congestion information that relate to the map information display area that will be displayed on the liquid crystal display 15, those items of congestion information for which the congestion level is "congested", then creates an overlap determination area that extends both transversely and longitudinally for a specified distance from the congestion link for each extracted congestion information item (S101). Next, the CPU 41 groups the congestion information items whose overlap determination areas overlap and creates, for each group of overlapping determination areas, an equal congestion level area by joining the overlapping determination areas. Each equal congestion level area is displayed on the liquid crystal display 15 in a color (for example, red) that corresponds to the congestion level of "congested" (S16 to S17). Next, the CPU 41 extracts, from the items of congestion information that relate to the map information display area that will be displayed on the liquid crystal display 15, those items of congestion information for which the congestion level is "not congested", then creates an overlap determination area that extend both transversely and longitudinally for a specified distance from the congestion link for each extracted congestion information item (S101). Next, the CPU 41 groups the congestion information items whose overlap determination areas overlap and creates, for each group of overlapping determination areas, an equal congestion level area by joining the overlap determination areas. The equal congestion level area is displayed on the liquid crystal display 15 in a color (for example, blue) that corresponds to the congestion level of "not congested" (S18 to S19). Finally, the CPU 41 reads, from the map information database 25, the map information for the roads of the types that will be displayed according to the scale of reduction of the display area, then displays the map information on the liquid crystal display 15 (S20).

Because the equal congestion level areas are constructed by joining the overlapping determination areas in each group, when the display area for the map information is reduced in scale to the specified level or smaller for a wide area display, the equal congestion level areas follow the displayed roads. It is therefore possible for the user to instantaneously recognize which roads in which areas are busy or congested and to easily determine, based on the map information, a detour that will bypass the congestion. Also, even when the display area for the map information is reduced in scale to the specified level or smaller for a wide area display, such that the display omits some roads, e.g. road sections excluded by the display scale, e.g. too small for display at that scale, the equal congestion level areas are formed by joining the overlapping determination areas in each group, which even include congestion links for congestion information items related to road sections that are omitted from the display, so it is possible to display in detail the congestion information for the road sections that are omitted from the display, and to display them in a form that follows the roads that are omitted from the display. It is therefore possible for the user to judge more accurately which roads in which areas are busy or congested.

Also, because each of the equal congestion level areas for "congested or busy", "congested", and "not congested" is displayed in superimposed form and in a different color, it is possible to show in detail the congestion information for roads that are omitted from the display, even when the display area for the map information is reduced to the specified scale, or smaller, for a wide area display. The distribution of congestion levels is also shown in the display. It is therefore possible for the user to recognize each displayed equal congestion level area instantaneously and to judge more accurately which roads in which areas are busy or congested, so the user can easily determine, based on the map information, a detour that will bypass the congestion.

Also, where the individual overlap congestion links have overlap determination areas which do not overlap, but their links are actually connected in a road network, an item of virtual congestion information is established with a virtual link that connects the overlap congestion links. Based on the virtual link, a joining overlap determination area that extends both transversely and longitudinally for a specified distance from the virtual link is created between the non-overlapping links. Creating an equal congestion level area by joining the overlapping determination areas and the joining overlap determination area makes it possible to display a congestion level area without any dips, distortions, or the like.

The scope of the present invention is not limited to the embodiments described above, and various improvements and modifications are possible within the scope of the appended claims. For example, the following modifications are intended to be included.

(A) As described above, each of the equal congestion level areas for the congestion levels of "congested or busy", "congested", and "not congested" is respectively displayed in a single color (for example, orange, red, or blue), but the equal congestion level areas may also be displayed three-dimensionally such that the height of any one equal congestion level area increases as the congestion level in the equal congestion level area increases.

(B) As described above, each of the equal congestion level areas for the congestion levels of "congested or busy", "congested", and "not congested" is respectively displayed in a single color (for example, orange, red, or blue), but the boundary portions of each equal congestion level area may also be blurred by displaying them in gradation.

(C) As described above, the display color of each equal congestion level area is determined based on the separate congestion levels of "congested or busy", "congested", and "not congested", but the travel time may also be included in the determination of the display color.

(D) As described above, after all the equal congestion level areas are displayed, the map information for each road is read from the map information database 25 and roads of certain types (determined by scale of the display) are displayed on the liquid crystal display 15, but the display order may be rearranged according to the road type. For example, state road map information may be read first from the map information database 25 and displayed on the liquid crystal display 15, after which the equal congestion level areas are displayed, after which metropolitan expressway map information is read from the map information database 25 and displayed on the liquid crystal display 15.

(E) As described above, the CPU 41 groups the items of congestion information according to the congestion levels of "congested or busy" and "congested", creates an equal congestion level area for each group, then displays the equal congestion level areas in superimposed form, each equal congestion level area having its own distinctive, single display color respective congestion level. However, alternatively, the CPU 41 may group only the items of congestion information for "congested or busy", create an equal congestion level area for each group, and then determine a display color to match the state of congestion for each equal congestion level area. Next, each equal congestion level area is displayed on the liquid crystal display 15. That is, the CPU 41 executes the sub-routine from S101 to S126. However, instead of executing step S123, the CPU 41 executes display color determination as described below.

First, the CPU 41 computes a total congested length, which is the sum of individual congested lengths for all of the congestion information items having a congestion level of "congested" located within the equal congestion level area that is created at S122. Also, the CPU 41 computes a total busy length, which is the sum of individual congestion lengths for all of the congestion information items having a congestion level of "busy" within the same equal congestion level area. Next, the CPU 41 multiplies the total congested length by a predetermined congested coefficient that is stored in advance in the ROM 43 (for example, 4 or the like) and multiplies the total busy length by a busy predetermined coefficient that is stored in advance in the ROM 43 (for example, 2 or the like). The CPU 41 then adds the two results to compute a total road busy length. The CPU 41 then divides the total road busy length by the total congested length. If the result is greater than or equal to a predetermined threshold value (for example, 3 or the like) that is stored in advance in the ROM 43, the CPU 41 determines that the display color for the equal congestion level area that was created at S122 is a first color (for example, red) that is stored in advance in the ROM 43, and the CPU 41 stores the display color in the RAM 42. Also, if the result obtained by dividing the total "busy" road length by the total "congested" road length is less than the threshold value (for example, 3 or the like) that is stored in advance in the ROM 43, the CPU 41 determines a second color for the display or the equal congestion level area that was created at S122 (for example, orange), and the CPU 41 stores the display color in the RAM 42.

In this manner, when the CPU 41 groups only the items of congestion information having a congestion level of "congested or busy", creates an equal congestion level area for each group, determines the display color to indicate the state of congestion in each area of equal congestion level, and executes S126, it becomes possible to display the distribution of the congestion levels of "congested" and "busy" simultaneously on the liquid crystal display 15.

What is claimed is:

1. A navigation system, comprising:
   a receiving section that receives traffic information including congestion information;
   a congestion information acquisition section that obtains from the traffic information, items of congestion information related to a map information display;
   a congestion information extraction section that extracts, from the items of congestion information obtained by the congestion information acquisition section, a congestion information group with a specified congestion level;
   an overlap determination area creation section that, based on road links related to the items of congestion information within the congestion information group, creates an overlap determination area that extends both transversely and longitudinally for a specified distance from the road link;
   a grouping section that groups the items of congestion information having overlapping determination areas;
   an equal congestion level area creation section that creates an equal congestion level area by connecting the overlapping determination areas of the grouped items of congestion information; and
   a display control section that displays the equal congestion level area superimposed on the map information display.

2. The navigation system according to claim 1, wherein
   the congestion information extraction section extracts the congestion information groups for a plurality of different congestion levels in sequence;
   the equal congestion level area creation section creates a plurality of different equal congestion level areas that respectively correspond to the congestion information groups extracted by the congestion information extraction section; and
   the display control section displays the plurality of equal congestion level areas superimposed on the map information display such that the different equal congestion level areas can be distinguished from one another.

3. The navigation system according to claim 2, wherein the display control section displays mutually differentiated display colors for the plurality of types of the equal congestion level areas superimposed on the map information.

4. The navigation system according to claim 1, wherein
   the equal congestion level area creation section comprises:
   a virtual link creation section that, where the road links have overlap determination areas which do not overlap and are directly connected in a road network, creates a virtual link that joins the road links; and
   a joining overlap determination area creation section that, based on the virtual link, creates a joining overlap determination area that extends both transversely and longitudinally for a specified distance from the virtual link; and wherein the equal congestion level area creation section creates an equal congestion level area by joining the joining overlap determination area with the overlap determination areas that overlap the joining overlap determination area.

5. The navigation system according to claim 2, wherein
the equal congestion level area creation section comprises:
a virtual link creation section that, where the road links have overlap determination areas which do not overlap and are directly connected in a road network, creates a virtual link that joins the road links; and
a joining overlap determination area creation section that, based on the virtual link, creates a joining overlap determination area that extends both transversely and longitudinally for a specified distance from the virtual link; and wherein
the equal congestion level area creation section creates an equal congestion level area by joining the joining overlap determination area with the overlap determination areas that overlap the joining overlap determination area.

6. The navigation system according to claim 3, wherein
the equal congestion level area creation section comprises:
a virtual link creation section that, where the road links have overlap determination areas which do not overlap and are directly connected in a road network, creates a virtual link that joins the road links; and
a joining overlap determination area creation section that, based on the virtual link, creates a joining overlap determination area that extends both transversely and longitudinally for a specified distance from the virtual link; and wherein
the equal congestion level area creation section creates an equal congestion level area by joining the joining overlap determination area with the overlap determination areas that overlap the joining overlap determination area.

7. The navigation system according to claim 1, wherein the display control section, when the map information display is reduced to a scale predetermined for a wide area display, superimposes the equal congestion level area on the map information display.

8. The navigation system according to claim 2, wherein the display control section, when the map information display is reduced to a scale predetermined for a wide area display, superimposes the equal congestion level area on the map information display.

9. The navigation system according to claim 3, wherein the display control section, when the map information display is reduced to a scale predetermined for a wide area display, superimposes the equal congestion level area on the map information display.

10. The navigation system according to claim 4, wherein the display control section, when the map information display is reduced to a scale predetermined for a wide area display, superimposes the equal congestion level area on the map information display.

\* \* \* \* \*